United States Patent Office 3,605,775
Patented Sept. 20, 1971

3,605,775
METHOD TO CONTROL DOSAGE OF ADDITIVE INTO TREATMENT PROCESS AND AUTOMATIC DEVICE THEREFOR
Carl J. Zaander, Clarendon Hills, Veljko Milenkovic, Glencoe, and Bernard A. Johnson, Deerfield, Ill., assignors to General American Transportation Corporation
Filed Nov. 18, 1969, Ser. No. 877,732
Int. Cl. E03b 1/00; G05d 11/00
U.S. Cl. 137—3
23 Claims

ABSTRACT OF THE DISCLOSURE

A method for controlling, by a novel feedforward-feedback adaptive system, a continuous process of treating a fluid, containing an ingredient, that includes incorporating a dosage of additive in the flowing fluid so as to change the ingredient. During the operation of the process, without the use of the control method, there can be unpredictable variations affecting the efficiency of the treatment so as to require correction of the dosage of additive to an unpredictable extent. A device for this system provides for automatic control of dosage of the additive. In the process there is a nonlinear relationship between the amount of additive and the degree of treatment. This relationship can be expressed as a monotonic curve within the range of concentration of the ingredient in the fluid and the range of dosage required for the desired extent of treatment.

The control method comprises: a feedforward control process including (1) monitoring the flowing fluid to sense a property of the fluid relevant to the treatment of the fluid by the additive, and (2) generating a first signal proportional to the magnitude of the sensed property of the fluid to be treated; a feedback control process including (1) monitoring a product of the treatment process to sense a property of that product relevant to the desired result of the treatment process, (2) generating a second signal proportional to the desired magnitude of the sensed property of the product, (3) generating a third signal proportional to the magnitude of the actual sensed property of the product, and (4) comparing the second and third signals to provide an error signal indicating the difference between the actual and desired sensed property of the product; an adaptive control process including (1) superimposing the first signal on the error signal by dividing the latter by the former to provide a fourth signal, (2) integrating the fourth signal over a long period of time to provide a fifth signal, and (3) multiplying the first signal by the fifth signal to obtain a sixth signal that includes the variable gain for the first signal by the extent of the fifth signal; and using the sixth signal to adjust the dosage of additive into the fluid.

The device for automatically controlling the dosage of additive performs the three basic control functions described above for the process. Thus the part of the device that provides a signal representing a comparison of actual and desired property of a product of the treatment is the feedback system that is used to adjust dosage with the adjustment time being made through an integrator to reduce the steady state error to zero. The signal proportional to the magnitude of the property of the fluid to be treated is the feedforward signal that provides essentially instantaneous corrective response while the other system is very slow. The control of the feedforward system to change with variation in one or more process conditions, e.g., efficiency, is determined by the feedback system that adjusts the gain of the feedforward system.

BACKGROUND OF THE INVENTION (1) Field of the invention

This invention relates to a method to control dosage of additive into a treatment process in which a fluid, preferably a liquid, contains an ingredient that is changed by the presence of the additive. In water treatment this change in the ingredient in the water by the presence of the additive can be a change of suspended colloidal material so that it will be flocculated and then removed by settling during the overall process. This change is illustrated by the addition of alum as the additive to water containing colloidal material in suspension. Such material is undesirably present in water to be used, e.g., for various industrial purposes. The alum serves as a flocculating agent and the control of dosage of alum in a water-treatment process is very important to insure sufficient removal of colloidal material by settling. The clarified liquid can be tested for a property indicative of the amount of suspended colloids remaining. With one method of treating with alum and using an apparatus commercially available for water treatment, it takes between one hour and four hours from the time of alum addition to the production of clarified water. The conventional time is about two hours.

The method to control dosage of additive into a treatment process and the automatic device to provide such control has been illustrated above by one use in the treatment of water in which an undesirable ingredient is removed by the treatment. The process of treating other liquids, aqueous and nonaqueous, for the purpose of converting an ingredient by chemical reaction can be advantageously performed using the present control method and automatic control device.

In one case, the additive is a material that reacts with the ingredient in the liquid to produce a useful product that can be separated from the liquid medium. The yield of the reaction product can be determined before or after separation from the liquid medium. In the former instance, the aqueous reaction product can be monitored to determine the concentration of the reaction product. In the latter instance, the separated liquid medium can be monitored to determine the concentration of unreacted ingredient or the excess additive.

In another case, the additive can be a catalyst for a reaction between the ingredient in the liquid medium and another material that may be incorporated in the liquid medium, with or without another utilization of the control method and device of the present invention.

In addition, the control method and the automatic control device can be used in treatment processes using a gas instead of a liquid as the fluid. Again, the additive may be a reactant or a catalyst with respect to a chemical reaction of the ingredient of the gas.

(2) Description of the prior art

Although the present invention can have many uses in the control of dosage of additives into a treatment process of numerous types, as described briefly above, the present method for control of dosage of additive into a treatment process and an automatic device capable of providing this control method as regards the prior art is best described primarily in relationship to the treatment of water with alum. However, brief reference will be made to control methods and devices that are believed to be different and are related to other field of technology.

U.S. Pat. No. 3,394,053 discloses a control process for controlling optimum distillate outflow rate of a fractionator that is used to separate hydrocarbons. The control device used in that process includes a feedforward system that initially adjusts the operations parameters of the fractionator and has a feedback loop that merely adjusts the system as a function of the deviation of concentration of one hydrocarbon in a sidestream from a predetermined set point. One feed is measured for flow rate to produce an output signal and concentration output signals are determined for two ingredients of the feed. One of these output signals is multiplied by a fixed factor representing the fractionator recovery factor. The multiplication produces an output signal that is summed with the other concentration output signal following which it is multiplied by the output signal representing the flow rate output signal of that feed. Another feed to the fractionator has a substantially constant known composition. The flow rate of this feed provides an output signal that is multiplied by another fixed factor that represents the recovery factor times a known concentration of an ingredient in that feed of constant composition. That output signal is summed with the other final output signal mentioned above with respect to the first feed. A sidestream product is analyzed for content of one ingredient to produce a feedback control signal that is subtracted from the signal, produced by the other operations mentioned above, as a feedback control correcting for imperfections in the feedforward calculations and deviations in the mathematical model from the process. This output is lagged by a time representing the process dead time and is dynamically shaped to compensate for the difference in response between a feed change and a distillate change by the use of an apparatus that duplicates the dynamic response of a variety of processing operations, such as evaporation and heat transfer. The end result is a control of the valve of distillate outlet line.

U.S. Pat. No. 3,196,189 describes a process of controlling a catalytic method of dehydrogenating butylene to form butadiene. The control includes an analog computer and analyzers for the feed and the product stream. The input voltage representing mole percent of butadiene in the feed is subtracted from the voltage indicating mole percent of butadiene in the product. This difference is divided by the mole percent butylene in the feed. The result is multiplied by a correction factor that represents the ratio of total moles of effluent to total moles of feed. The computer's signal, representative of the percent yield of butadiene, is used by a transducer to provide an air signal. The latter signal is used with two other signals in a totalizing operation to adjust the feed rate and the bottom temperature of the catalyst bed. There is a maximum allowable temperature for the bottom of the bed. When this is reached, the sole adjustment is that of flow rate of feed.

None of the prior art appears to describe a process in which there can be several variables occurring in an unpredictable manner and in which the results of these variables cannot be predicted. One process in which variables can occur in an unpredictable manner is the process of water treatment with a flocculation or coagulation aid to reduce the concentration of suspended colloidal material. The concentration of such material in the water to be treated can vary with the season of the year. For example, when lake water is used, concentration of suspended colloids is relatively low in the winter months if the lake is in the northern part of the United States. This is because an ice layer protects the water from disturbance by the wind. During the spring and summer months the concentration is substantially higher and it will vary. Furthermore, the composition of the colloidal substances can vary from time to time so that the required amount of flocculation material, such as alum, for the desired degree of treatment will vary.

In the treatment process there are other variables for treating water that are known to be related to the ease of coagulation and the effectiveness of the chemical additive used to promote this coagulation. These variables include particle size, alkalinity, ionic constituents, the base exchange capacity of the water, the charge on the colloids (the zeta potential), and the hydration, which refers to the attraction of the hydrogen cations or hydroxyl anions of water to the surface of the colloid. The specific attraction can be hydrophobic or hydrophilic. As a result, the art of water treatment is such that the type and dosage of additive as a coagulant necessary for a particular type of water has been determined experimentally in the laboratory.

The alum treatment method for water comprises a vigorous mixing of alum and water, subsequently gently agitating the mixture so that floc formation is enhanced, and then allowing the material to settle as sludge with a clarified water layer above it. Part of the sludge can be recycled to the water during or just before the vigorous mixing of the water with alum. It is well known that this recycle of sludge enhances the flocculation for more efficient removal of suspended colloid particles.

U.S. Pat. No. 3,067,133 describes a water treatment method using alum as the flocculating aid. The patent recognizes the prior art problem of excess dosage of additive as flocculation or coagulation aid when using manual control. The use of more additive than is necessary can substantially increase the cost of water treatment. The method of that patent includes sampling the water after the addition of the additive, adding a filter aid to the sample, filtering the sample, and monitoring the filtrate as regards its turbidity to produce a signal for a control device that adjusts the dosage of clarifying chemical in proportion to this signal. By the use of the sampling technique with the filtration to provide a fast result of the effect of the amount of additive, there is a control of dosage based on what may be termed a feedback system.

U.S. Pat. No. 3,238,128 discloses a process for the treatment of water with lime to reduce alkalinity and to provide a clarified product. The process is automatically controlled by adding an excess of lime to one portion of the liquid to be treated. The excess is controlled by measuring the conductance of that portion of the water after the lime addition and measuring the conductance of the untreated water. The excess of lime is such that the ratio of these conductances is about 1. The other portion of the water is added to this lime-treated portion having that ratio of conductance. This is another feedback system.

SUMMARY OF THE INVENTION

This invention relates to a method and to an automatic device to control the dosage of an additive incorporated into a continuous treatment process. The treatment process comprises passing a fluid through a zone in which a dosage of additive is incorporated in the fluid, passing the fluid to another zone in which the treatment occurs, and separating material, affected by the presence of the additive, from other ingredients of the initial fluid. The additive may be a material that is changed by the presence of the fluid in which it is incorporated and the changed material causes a desired change in one of the ingredients of the fluid. Alternatively, the additive without change may be a material that reacts with one of the ingredients of the fluid to produce a new chemical product during the treatment and the product is separated from the unreacted portion of the fluid. In a third variation of the process, the additive may be a catalyst for a reaction between two ingredients of the fluid. In all cases it is necessary to control the dosage of additive to prevent an excessive use of the additive that would increase undesirably the cost of the treatment process. If the additive is incorporated in an excesssive amount in some treatment processes, the unused portion of the additive is difficult to separate from one of the desired products. This is undesirable. The process of the invention controls the dosage of additive for the treatment process so that the excess dosage is minimized.

The control method includes a feedforward control process, a feedback control process, and an adaptive control process. The control method is such that the feedforward control process can be utilized directly to control dosage of additive without the functioning of the feedback control process and the adaptive control process to provide a variable gain in the feedforward process. This occurs when the only variation taking place in the treatment process, other than change in rate of flow of fluid, is a change in the composition of the fluid to be treated such that dosage of additive should be changed. In such a case, the feedforward control process operates to provide a change in signal that is used to adjust the dosage of additive to the proper extent so that the desired result as regards quality of product from the treatment is continued. In the usual case such change in dosage by the feedforward control process will not provide exactly the proper dosage, because the change in composition of the fluid to be treated may be such that relationship between dosage and such change is not capable of being sufficiently known to be expressed mathematically for duplication in the feedforward control process. This is especially true when a variation of the nature of the ingredient in the fluid to be treated can vary the dosage to a considerable extent, as in the case of the treatment of water as the fluid.

The preferred fluids to be treated by dosage of additive with the control method of the present invention are liquids. Especially preferred are aqueous liquids. The control method is especially suitable for treatment processes in which there is a substantial residence time between the incorporation of the additive and a separation of a product that can be examined for a desired property.

The control method is eminently suitable for a treatment process that can change in efficiency in an unpredictable manner. This change occurs in the alum treatment of water to reduce content of suspended colloids. The decrease in efficiency of flocculation and/or separation using conventional treatment equipment can occur, but the time of the start of efficiency loss and the rate of loss cannot be predicted.

The control method comprises the two steps recited for the feedforward control process, the four steps recited for the feedback control process, and the three steps recited for the adaptive control process in the foregoing abstract of the disclosure. In addition, the control method includes the step of using the third step of the adaptive control process to adjust the dosage of additive into the fluid to be treated.

The control method of the present invention and the automatic control device that implements the control method can be expressed mathematically, as regards its function, by one of the following two equations that represent different embodiments of the mode of combining the various steps of the control method. These equations are as follows:

$$D = (C_i - nC_s) K_1 \int \frac{(C_o - C_s)}{C_i - nC_s} dt \quad (1)$$

$$D = K_2 \int (C_o - C_s) dt + K_3 \int \frac{D\dot{C}_i}{C_i - C_s} dt \quad (2)$$

wherein D is the dosage as a signal, $C_i$ is a signal proportional to the magnitude of the sensed property of the fluid to be treated, $C_s$ is a signal proportional to the desired magnitude of the sensed property of the product, $C_o$ is a signal proportional to the actual magnitude of the sensed property of the product, $\dot{C}_i$ is a signal that is a derivative of $C_i$, $n$ is either 1 or 0, and $K_1$ and $K_3$ are constants. In the first equation when $n=0$ the integral is multiplied only by $C_i$ and $K_1$. Alternatively, when $n=1$ the integral is multiplied by the $K_1$ times the difference between the two indicated signals. Although the magnitudes of these values that are used to multiply the product of $K_1$ and the integral are different, the chosen value of $K_1$ is dependent on whether $n=0$ or $n=1$.

The earlier description of the control method of the invention sets forth the method expressed by Equation 1 in which there is a multiplication as the third step recited for the adaptive control process. As an alternative, the method can use steps that correspond with Equation 2. In that case, the control method includes the steps of differentiating the signal proportional to the actual magnitude of the sensed property of the fluid to be treated, multiplying the output signal from this differentiation operation by the output signal of the integration operation which is the second step of the adaptive control process and dividing the resultant output by a signal obtained by comparing the signal proportional to the actual magnitude of the sensed property with the signal proportional to the desired magnitude of the sensed property of the product. The output from this division operation is integrated with and added to the error signal indicating the difference between the actual and desired magnitude of the sensed property of the product. In this case Equation 2, mentioned above, in effect represents this modified combination of steps of the control method, especially where there are relatively small changes in the nature of the feed and the changes in the efficiency resulting from change in conditions and equipment used in the treatment.

The automatic control device of the present invention comprises: first means to monitor a fluid to sense a property; means to generate a first signal proportional to the actual magnitude of the property sensed by said first monitoring means; second means to monitor a material to sense a property of that material; means to generate a second signal proportional to the desired magnitude of the property sensed by said second monitoring means; means to generate a third signal proportional to the magnitude of the property actually sensed by said second monitoring means; means to compare the second and third signals to provide an error signal indicating a difference between the actual and desired magnitude of the property sensed by said second monitoring means; means to divide the error signal by the first signal to provide a fourth signal; means to integrate the fourth signal over a long period of time to provide a fifth signal; and means to multiply the first signal by the fifth signal to obtain a sixth signal based on the fifth signal providing a variable gain for the first signal. The sixth signal provides means by which variable feed means such as a pump can be controlled in its operation to vary the dosage of additive incorporated into a flow of fluid as part of a process of treating the fluid.

In the foregoing description of the method and device of the invention, reference has been made to the generating and producing of signals. In the preferred embodiments described later these signals take the form of voltage signals at least in the initial components of the device or the initial steps of the method, but other types of signals can be used as alternatives for voltage signals. In one of the embodiments described later voltage signals in the later steps of the process and later-recited components of the control device take the form of mechanical equivalents to the functions performed with voltage signals at least insofar as the function of integration is concerned and partly for the function of multiplication.

DESCRIPTION OF THE DRAWINGS

Preferred embodiments of the automatic control device of the present invention are shown in the accompanying drawings, along with a schematic representation of equipment used for the treatment process. These drawings include.

In the drawings of the embodiments, similar components performing in the same function in the process are generally designated by the same numeral.

DETAILED DESCRIPTION

Figure 1:
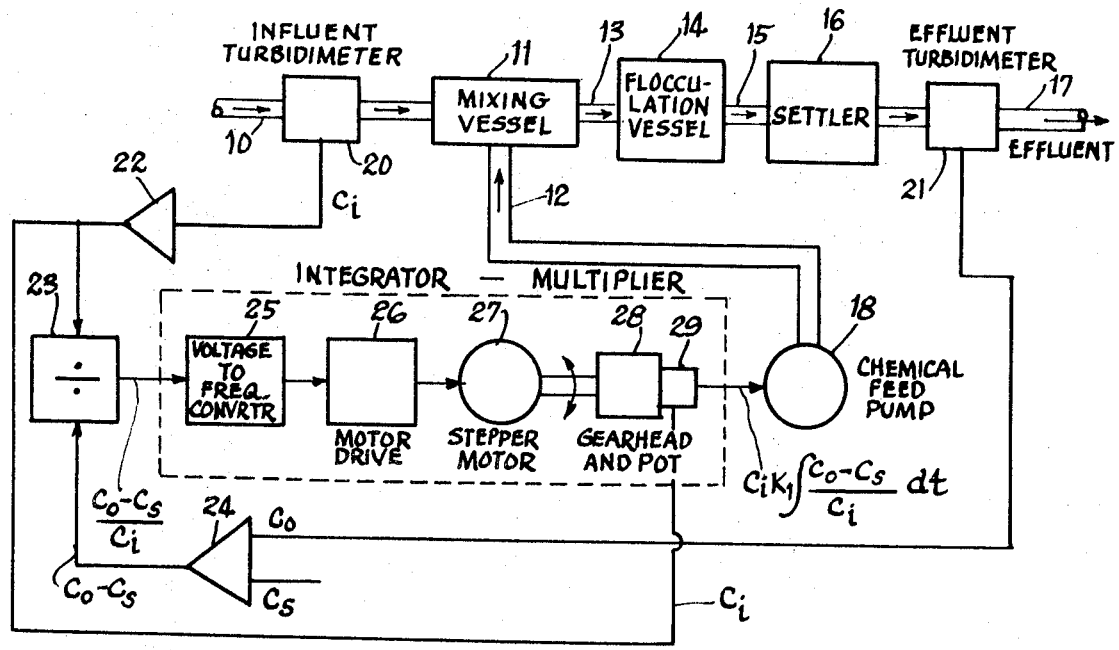
FIG. 1 is a schematic representation of an electromechanical embodiment of the control device of the present invention that is shown along with a schematic representation of the treatment process equipment.

The process of the invention and the automatic control device of the present invention can include a measurement of one property of the feed, i.e., the fluid to be treated, and a measurement of a different property of a product of the treatment. For simplicity it is preferred to measure the same property of both feed and product. In the description, that follows, of four embodiments of the device as used in the present method, the turbidity of water in an alum treatment of water is measured for the influent water to be treated and for clarified water separated as an effluent product in a later step of the overall treatment process.

In the study, that was made as a part of the development of the present invention, it was found that there is a nonlinear relationship between the amount of alum required to be added based upon a change in turbidity of the feed to provide by the treatment a clarified water having a specific turbidity. Many uses of the water treatment process do not require that water be treated to produce a clarified aqueous product having no turbidity. The economics are such that water of reduced but some degree of turbidity is the desired objective because the water of a slight degree of turbidity can be used without deleterious results.

The treatment of water to reduce the concentration of colloidal substances is primarily a coagulation process that takes place after the addition of a small quantity of some chemical that is a coagulation or flocculation aid. Colloidal substances give the water its turbidity and can impart color. The turbidity is usually associated with a small quantity of clay or sand together with some organic material in the water. Colloidal metal hydroxides and relatively complex organic compounds called fulvic acids are usually responsible for the color. The colloidal particles having sizes in the range of 1 m$\mu$ to 1$\mu$ ($10^{-3}$ mm. to $10^{-6}$ mm.) are small enough to pass through ordinary filters. Also, larger particles that are suspended in the water may have properties of a colloid.

In the treatment process the additive, such as alum, is incorporated in the water and the mixture is mechanically agitated for a thorough dispersing of the additive. During this time visible particles called floc start to appear in the aqueous medium. After a sufficient period of time, aqueous material is moved into another zone where there is some, but less, agitation. In that zone the primary floc particles are caused to collide and thereby produce aggregates. Of course, the agitation is insufficient to break up any aggregates that have formed. In this zone the suspended colloidal particles are attracted to the floc particles, so that the floc particles grow in size and remove colloidal particles from their original separate existence in suspension in the aqueous medium. After sufficient time for this formation of aggregates and the combining of colloidal particles with the floc particles the mixture is transferred to another zone where the large particles that has formed settle from a quiescent aqueous medium. As a result, there is formed in this zone a clarified water having a turbidity much lower than the initial feed. Also formed is a sludge. Part of this sludge is conventionally recycled to a place upstream in the continuous treatment for the purpose of being mixed then with influent water or perhaps with alum in water, but ultimately with the combination of alum and water being treated. This recycle of sludge promotes the effectiveness of removal of colloidal substances by the flocculation, etc., that have been described above.

One type of apparatus that provides zones for intimate mixing of alum and the subsequent zones described above for the process of coagulation and aggregation and subsequent process of settling is disclosed in U.S. Pat. No. 3,238,128 mentioned above.

The turbidity of water is an optical property of the water and the turbidity is responsible for the scattering or absorption of incident light. In the development of the present invention it was found that it is not possible to correlate the weight percentage values of suspended materials directly with the magnitude of turbidity because the exact relationship depends on the shape, size and refractive index of each particle in the water being examined for turbidity. In the present invention with respect to water treatment it is preferred to monitor the turbidity of the fluid and that of the effluent or clarified water. Such turbidity can be easily measured photometrically.

One can measure the influent turbidity using a transmission-type instrument which is effective at high turbidity values. As mentioned earlier, the usual water treatment process requires the removal only of the bulk of the colloidal material. Thus the relative inaccuracy of this instrument is not objectionable. An illustrative instrument of this type is the falling-stream turbidity meter manufactured by Hach Chemical Co., Ames, Iowa. Because the turbidity values for effluent clarified water are desirably small, the effluent measurement for turbidity can use a scatter-type photometer. Any errors that would be attributable to large suspended particles in the effluent would be expected to be of no real significance as most of the large particles in the influent would be removed by the water treatment process. An illustrative surface scatter turbidimeter made by Hach Chemical Co. has been found to be suitable. In later development studies, there was used a turbidimeter made by Hach Chemical Co. that has two scale ranges. It operates by measuring light scattered by the colloidal material in the water. Its low scale range is between 0 and 0,2 JTU (Jackson Turbidity Unit, a standard measure of turbidity in the water treatment field) and has a high turbidity range of between 0 and 1,000 JTU.

The dosage of coagulant additive, such as alum, necessary to reduce expected JTU turbidity of raw water to the desired JTU value of effluent clarified water can be determined by well-known laboratory experimentation. It was determined that there is an exponential relationship between alum dosage and final turbidity at equilibrium. It has been found also that a plot of the amount of alum required for various reductions in turbidity in raw water having various turbidity values provides a family of curves. For the higher turbidity values of the raw water the initial effect with a very small amount of alum appears to be a slight increase in turbidity, but that part of those overall curves can be ignored because such small amount of alum would not be utilized in the water treatment. Thus the curves may be considered to be monotonic in the range of use and range of variation of conditions including efficiency.

Referring to FIG. 1, the water treatment process passes influent raw water through a pipe 10 to a mixing vessel 11 to which is also added alum as the chemical additive by a pipe 12. Vigorous agitation occurs in vessel 11 with initiation of floc formation and the mixture is transferred continuously by a pipe 13 to a flocculation vessel 14 in which colloidal material and floc produced by the hydrolysis of alum occurs. In vessel 14 the agitation is less vigorous as mentioned earlier. The material is transferred by a pipe 15 after sufficient residence time to a settler 16 from which ultimately clarified effluent water is removed by a pipe 17. The pipe 12 feeds alum to vessel 11 by the use of a pump 18 that is connected to a chemical reservoir or supply tank 19 (see FIG. 3). The foregoing description of separate vessels 11, 14 and 16 and transfer pipes 13 and 15 is merely illustrative.

The pump 18 is a variable-capacity feed pump that includes a motor and means to vary the length of stroke. The voltage to the motor determines the speed of the motor and thus the speed of operation of the pump. As seen later in this description, a change in voltage to the motor is utilized to control dosage of additive. The independent control of dosage dependent on the change in flow of water in pipe 10 is monitored by a flow meter (not shown) that provides a pneumatic signal to control the stroke of the piston of the pump. This use of independent means to control the pump in accordance with the flow is conventional.

The automatic control device shown in FIG. 1 includes an influent turbidimeter 20 and an effluent turbidimeter 21 that are shown merely in box form. Of course, such turbidimeters usually monitor a continuously withdrawn portion of the fluid flow and provide voltage signals that are proportional to the magnitude of turbidity of the liquid passing through the turbidimeter.

Figure 3:
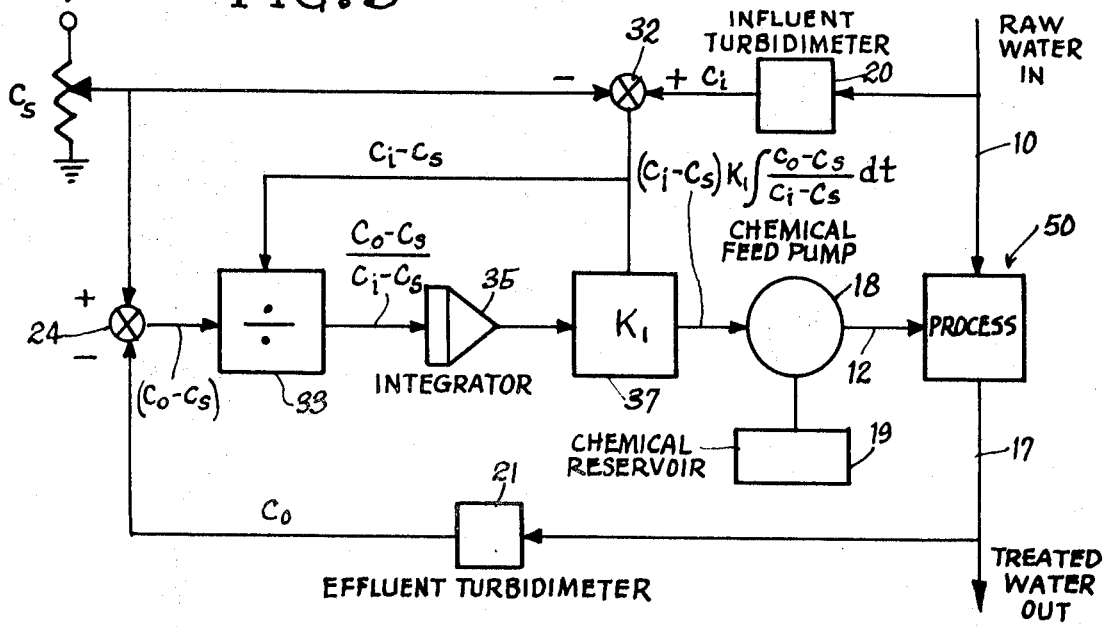
FIG. 3 is a schematic representation of a third embodiment of the device of the invention combined with a more simplified presentation of the treatment equipment.

The influent turbidimeter 20 provides a voltage signal $C_i$ that is raised in level by an amplifier 22 to provide an output voltage signal. The output of amplifier 22 is an input to an electronic divider 23. The effluent turbidimeter 21 provides a voltage signal $C_o$. This voltage signal is an input to a comparator 24 that has, as another input, a preset voltage signal $C_s$. The comparator 24 provides an output voltage signal representing the difference between voltage signal $C_o$ and preset voltage signal $C_s$, namely $(C_o - C_s)$. The input voltage $C_s$ is proportional to the desired magnitude of turbidity of effluent, i.e., clarified water, passing through outlet pipe 17. This set voltage signal is obtained by use of a potentiometer (as seen in FIG. 3). The output voltage of comparator 24 is the other input to electronic divider 23 so that voltage $(C_o - C_s)$ is divided in divider 23 by voltage $C_i$ (amplified by amplifier 22, but this amplification is ignored for the purpose of showing on FIG. 1 the various voltage signals).

The output voltage signal of divider 23 is converted by a voltage-to-frequency converter 25 to a pulse frequency in which the rate of pulse is proportional to the voltage level of the ratio expressed as output voltage of divider 23. The pulse frequency is fed to a motor drive 26 that converts pairs of the pulses to the proper power to drive a stepper motor 27. The motor drive 26 takes the two pulses at a time and, dependent upon whether the pair of pulses is positive or negative, energizes one or the other of two sets of two field coils of motor 27, which is a motor of the variable reluctance type. The motor 27 has six field coils. One set of two field coils is always energized. The motor 27 requires another set to operate the motor in one direction or the other dependent on which one of the other two sets is energized. The motor drive 26 and stepper motor 27 are conventional equipment as are the other components being described. Of course, the integration function can be performed by the use of some mechanical or electromechanical means, other than a stepper motor. For example, a D.C. motor-tachometer combination may be used and the block diagram of FIG. 1 would be essentially unchanged.

For every pair of pulses received by motor drive 26, stepper motor 27 has its shaft moved 15° about its axis. In the operation of motor drive 26 and stepper motor 27 used in the control device being described, the pairs of pulses received can vary from 0 pair of pulses to 1000 pair of pulses per second.

The shaft of motor 27 drives a shaft of a gearhead 28 at a reduced rate. The ratio is 7000:1, i.e., 7000 rotations of the shaft of motor 27 provides one rotation of the output shaft of gearhead 28. The latter shaft drives axially and rotationally about its axis a 10-turn potentiometer 29 that has its wire helix contacted by a wiper. A voltage proportional to $C_i$ is applied to the helix of potentiometer 29. The output from the wiper is the product of $C_i$ and the integrator output represented by the position of the helix. The output voltage of the wiper of potentiometer 29 determines the speed of operation of the motor of pump 18.

In view of the foregoing description of the automatic control device shown in FIG. 1 it is apparent that the integration of the output voltage from the divider 23 and the operation of potentiometer 29 is the electromechanical equivalent of electronic integration and multiplication, the latter multiplying the integrated value by the voltage signal $C_i$. It is also apparent that the device functions in a manner that is equivalent to Equation 1 in which both values of $n=0$.

Figure 2:
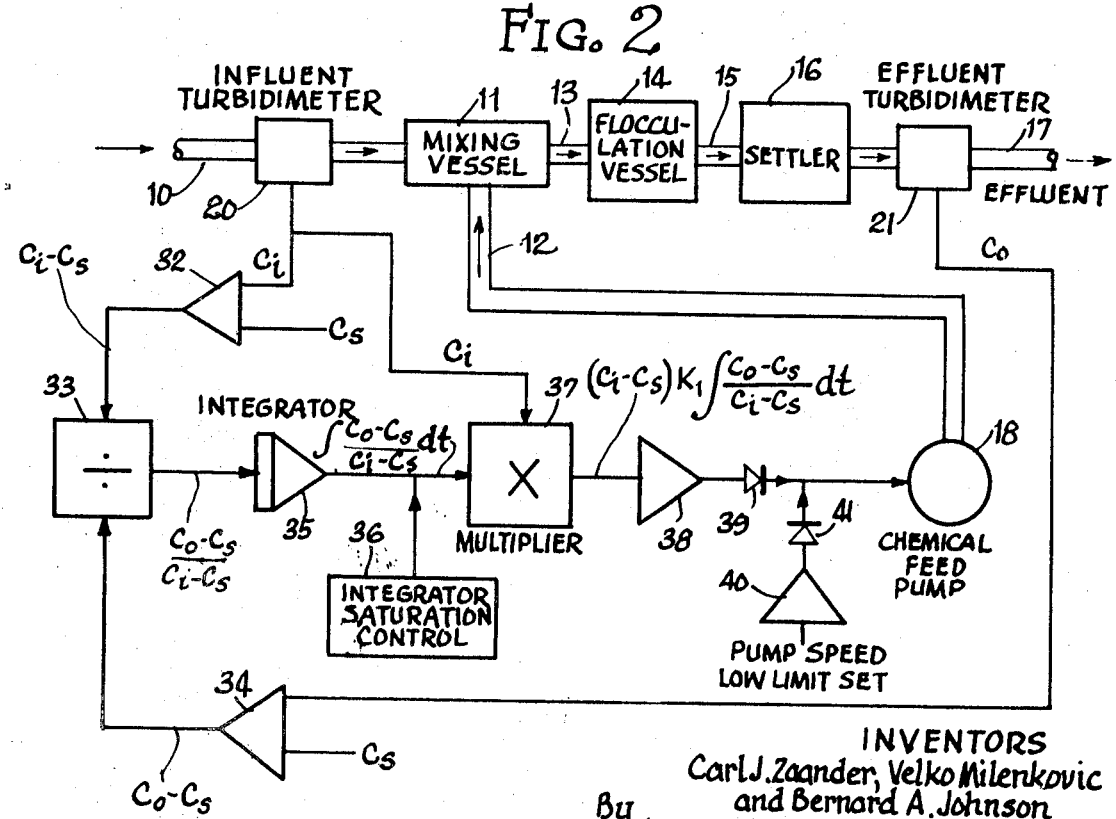
FIG. 2 is a schematic representation of the combination of the equipment for fluid treatment with dosage of additive, as in the case of FIG. 1, but showing a different embodiment of the control device.

Referring to FIG. 2, the equipment for treating water with dosage of alum additive includes pipe 10, vessel 11, side pipe 12, pipe 13, vessel 14, pipe 15, settler 16, pipe 17, and pump 18 as in FIG. 1. There is also present as part of the automatic control device turbidimeters 20 and 21. The voltage signal $C_i$ and set voltage signal $C_s$ are inputs to a comparator 32. The output of the voltage signal of comparator 32 is an input to an electronic divider 33 that receives as its other input an output voltage signal from a comparator 34 having, as its inputs, voltage signal $C_o$ and voltage signal $C_s$, as in the case of comparator 24 of FIG. 1, to provide a voltage signal representing $(C_o - C_s)$. The output of divider 33 has a voltage signal representing the output of comparator 34 (representing $C_o - C_s$) divided by output of comparator 32. This output signal of divider 33 is the input of an integrator 35 that is prevented from exceeding a predetermined maximum voltage by an integrator saturation control 36. The output signal of integrator 35 is an input to a multiplier 37 along with voltage signal $C_i$ as an input. Thus the output voltage signal of integrator 35 is multiplied by voltage signal $C_i$. The output of multiplier 37 is raised in level of voltage by an amplifier 38 that is connected to the motor of pump 18 through a diode 39. In parallel with amplifier 38 and diode 39 is a circuit containing an amplifier 40 having an input of predetermined minimum voltage to provide an output of minimum voltage that is impressed on the motor of pump 18 through a diode 41. The diodes 39 and 41 isolate voltage of amplifiers 38 and 40 from amplifiers 40 and 38, respectively.

In view of the foregoing description it is apparent that the control device shown in FIG. 2 utilizes the function expressed as Equation 1 in which the first $n=0$ and the second $n=1$. Of course, the device of FIG. 2 could be modified so that both values of $n$ are 1. It is preferred that the first $n=1$. Such utilization of the function of Equation 1 in which both values of $n=1$ are illustrated in FIG. 3 described below.

The pipes 13 and 15 and vessels 11, 14 and 16 are combined in FIG. 3 as one block generally designated process 50. The influent pipe 10 and the effluent pipe 17 are shown, along with turbidimeters 20 and 21 that monitor turbidity of influent and effluent. The voltage signal $C_i$ of turbidimeter 20 is compared with set voltage $C_s$ by comparator 32 to provide an input voltage signal representing $(C_i - C_s)$ to divider 33. The voltage signal $C_o$ of turbidimeter 21 is compared with preset voltage signal $C_s$ by a comparator 24 to provide a second input voltage signal representing $(C_o - C_s)$ to electronic divider 33. The second signal is divided by the first-mentioned input signal. The output signal of divider 33 is an input signal to integrator 35 that has its output multiplied, by multiplier 37, with the output signal of comparator 32. The output of multiplier 37 is a voltage that determines the speed of the motor of pump 18 for feeding additive by pipe 12 to process 50.

Figure 4:
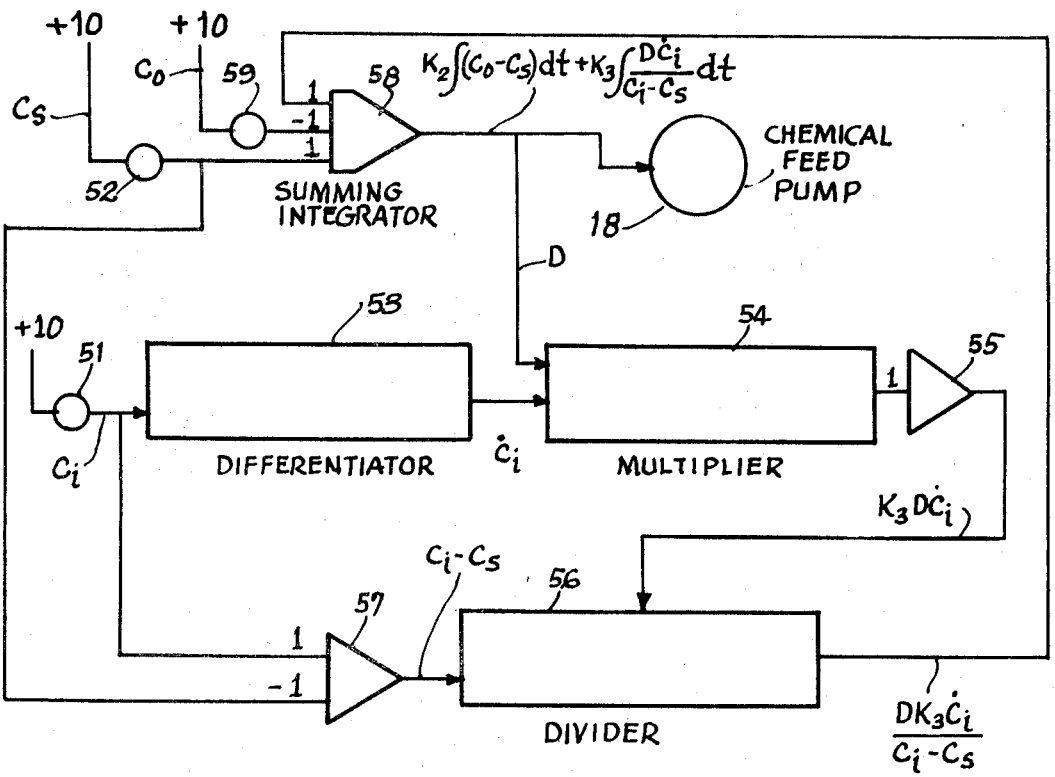
FIG. 4 is a schematic representation of a fourth embodiment of the device of the present invention showing merely the additive or chemical feed pump that, of course, is used to incorporate additive to fluid to be treated by the additive in the treatment equipment.

Referring to FIG. 4, which illustrates an embodiment of the automatic control device functioning in accordance with Equation 2, pump 18, of course, provides by line 12 the additive to process 50 (both not shown in FIG. 4). The output signal $C_i$ of turbidimeter 20 (not shown) is multiplied by a constant by using a coefficient potentiometer 51. Likewise the voltage signal $C_o$ of turbidimeter 21 is multiplied by a constant by using a coefficient potentiometer 59. For the purpose of comparing the functioning of the device of FIG. 2 with Equation 2 these coefficient multiplications can be ignored and thus reference hereafter is made to voltage signal $C_i$ and voltage signal $C_o$.

The derivative of voltage signal $C_i$ is obtained by a differentiator 53 and this derivative $\dot{C}_i$ is an input to a multiplier 54. The other input to multiplier 54 is a voltage signal D representing the voltage applied to the motor of pump 18. The voltage signal resulting from this multiplication of voltage signals is increased in value by an amplifier 55. The output of the latter is an input to an electronic divider 56 in which that input is divided by an input that is obtained as an output of a comparator 57 having input voltage signals $C_i$ and $C_s$. The output signal of comparator 57 represents $(C_i-C_s)$. The output of divider 56 is one of three inputs to a summing integrator 58. The other inputs are voltage signal $C_o$ and set voltage signal $C_s$, the latter being increased in level by a coefficient potentiometer 52.

Referring again to FIG. 1, it is seen that signal $C_i$, by being fed to potentiometer 29, determines directly the necessary change in dosage with change of turbidity of water feed. Thus when the turbidity of water increases, the value of $C_i$ increases. The end result is an immediate increase in voltage to the motor of pump 18 so as to increase the dosage of additive to the water. Similarly when the value of signal $C_i$ decreases, the immediate result is a reduction of dosage. This is a feedforward control system. When the value of signal $C_o$ changes, there is a change of the error signal which is the difference between $C_o$ and $C_s$. This change will result in a change in pulse rate by converter 25 so as to cause stepper motor 27 to step in one direction or the other by a proportional amount and in the direction dependent upon the direction of change of the value of signal $C_o$. That value may decrease if too much additive has been introduced or if a change in water results in a greater efficiency of the treatment. This means a dosage of additive is being used in excess of that required for the desired degree of reduction of colloidal material in the water. The value of signal $C_o$ may increase because of insufficient dosage or because of a change in conditions of the process or a change in the efficiency of the equipment insofar as assisting in the performance of the steps of the treatment.

It is seen that the operation of stepper motor 27 provides a history of all of these changes that have occurred with respect to the value of signal $C_o$ from the time of the start of the operation by utilization of turbidimeter 21. This stored information is reflected also by the position of the helix of potentiometer 29 with respect to the wiper of that potentiometer. It is also seen that the integration provided by converter 25, drive 26, motor 27, gearhead 28 and potentiometer 29 provide a feedback control system.

In addition to the feedback control system, mentioned in the next preceding paragraph, the integration provided by the equipment provides a variable gain of the signal of the feedforward control. To provide a satisfactory type of gain, the output of divider 23 is a voltage representing a ratio of the difference between signal $C_o$ and signal $C_s$ divided by the signal $C_i$.

Assuming $C_o$ is greater than $C_s$ and the output turbidity increased and the feedback system did not include divider 23, the feedback system would drive the integrated output in the positive direction to increase chemical dosage, but at the same time this would increase the feedforward gain. If the turbidity is decreased sufficiently, the reverse will happen.

The presence of the divider maintains the feedback gain constant. Without the use of divider 23 the gain of the feedback system or loop is proportional to the influent turbidity. For example, if the influent turbidity doubles, the gain of the feedback system will double. This could lead to instability and response problems. Thus the divider is present as it effectively compensates for changes in process efficiency, thereby maintaining the gain of the feedback system constant.

From the foregoing it is seen that the overall control method and automatic control device provide an integrated system for maintaining good control of dosage.

Referring to FIG. 2, it is seen that any change in turbidity of influent water provides an immediate change in the operation of pump 18 as voltage signal $C_i$ is fed directly to multiplier 37. This is the feed-forward control system or loop. The integrator 35 provides a gain of the feedback control system. This is a gain with respect to the error signal indicated by comparator 34 that has its output reflecting a change in turbidity of effluent water. The integrator 35 controls the gain by the past history of changes of signal $C_o$ so that the change of voltage to the motor of pump 18 is not a direct relationship but is proportional to the history of the valve of signal $C_o$. This is the feedback control system. The divider 33 provides the same control as mentioned above for divider 23 of the embodiment of FIG. 1. The signal, by which the error signal is divided in the embodiment of FIG. 2, is the difference between signal $C_i$ and signal $C_s$ but, of course, signal $C_i$ could be used, instead of this difference, as the dividing input to divider 33.

Referring to FIG. 3, the embodiment differs from that of FIG. 2 essentially by using in the feedforward system the difference between signal $C_i$ and signal $C_s$ instead of merely using signal $C_i$. The feedback system and the use of divider 33 is the same for the feedback system and the adaptive control system. The embodiment shown in FIG. 3 does not include diodes 39 and 41, along with amplifier 40, as additional components to insure minimum pumping speed, as does that of FIG. 2.

Referring to FIG. 4, the signal $C_i$ is used in a feedforward control system that includes the signal controlling the operation of the pump 18. By differentiator 53 a derivative of signal $C_i$ is taken and that is multiplied in multiplier 54 by that signal D controlling the pump, followed by a division of that result in divider 56 that has as its other input the difference between signal $C_i$ and set signal $C_s$. The output of divider 56 is an input to summing integrator 58 so that part of the output of the later is from the integration of error signal $(C_o-C_s)$ and part is from the integration of the output from divider 56. Thus it is seen that the change in signal $C_i$ through the use of differentiator 53, that provides a derivative of $C_i$ with respect to time, multiplier 54, divider 56, and summing integrator 58 provide a direct means for changing the operation of the motor of pump 18 in accordance with a change in value of $C_i$. This is the feedforward control system. The feedback control system is based on the error signal mentioned above and its integration, before being added to the output from divider 56, provides a variable gain as the change in error signal affects a change of dosage signal D that is utilized by multiplier 54 as a gain for signal $C_i$ of the feedforward control system. Again the use of a divider, namely, divider 56 in which a signal, determined in part by the nature of the error signal $(C_o-C_s)$, is divided by a difference signal $(C_i-C_s)$, in effect as in Equation 1, to compensate for a change in process efficiency. At the same time, this ratio stabilizes the system for the same purpose mentioned above with respect to FIG. 1. Thus Equation 2 represented by the embodiment of FIG. 4 provides essentially the method of control of dosage as the control expressed by equation (1) illustrated by the embodiments of FIGS. 1 through 3.

In the equations, $K_1$, $K_2$ and $K_3$ are constants that are positive or negative, with their signs dependent on the treatment process, but $K_2$ and $K_3$ are both positive or both negative.

In view of the foregoing description of the invention and the preferred embodiments, it should appear that the method of the present invention is a method to control dosage of additive into a fluid in a continuous treatment process for a fluid that contains an ingredient that is changed by the presence of the additive, in which the control method comprises: (1) monitoring the fluid to be treated to sense a property of the fluid relevant to the treatment of the fluid by the additive; (2) generating a first signal proportional to the magnitude of the sensed property of the fluid to be treated; (3) monitoring a product of the treatment process to sense a property of that product relevant to the desired result of the treatment process; (4) generating a second signal proportional to the desired magnitude of the sensed property of the product; (5) generating a third signal proportional to the magnitude of the actual sensed property of the product; (6) comparing the second and third signals to provide an error signal indicating the difference between the actual and desired sensed property of the product; (7) performing certain operations including an integrating operation, a multiplying operation and a dividing operation in which said first signal is utilized in the multiplying operation and in the dividing operation as a divider and in which said error signal is used in the integrating operation along with a relationship between these operations such that these certain operations can be expressed mathematically in their function in accordance with one of the following equations:

$$D = (C_i - nC_s) K_1 \int \frac{(C_o - C_s)}{(C_i - nC_s)} dt \quad (1)$$

$$D = K_2 \int (C_o - C_s) dt + K_3 \int \frac{D\dot{C}_i}{C_i - C_s} dt \quad (2)$$

wherein D is the dosage as a signal, $C_i$ is a signal proportional to the magnitude of the sensed property of the fluid to be treated, $C_s$ is a signal proportional to the desired magnitude of the sensed property of the product, $C_o$ is a signal proportional to the actual magnitude of the sensed property of the product, $\dot{C}_i$ is a signal that is a derivative of $C_i$, each $n$ separately considered is either 1 or 0, and $K_1$, $K_2$ and $K_3$ are constants; and (8) using said dosage signal to adjust the dosage of additive into the fluid.

Similarly, the automatic control device of the present invention comprises: (1) first means to monitor a fluid to sense a property; (2) means to generate a first signal proportional to the actual magniture of the property sensed by said first monitoring means; (3) second means to monitor a material to sense a property of that material; (4) means to generate a second signal proportional to the desired magnitude of the property sensed by said second monitoring means; (5) means to generate a third signal proportional to the magnitude of the property actually sensed by said second monitoring means; (6) means to compare the second and third signals to provide an error signal indicating a difference between the actual and desired magnitude of the property sensed by said second monitoring means; (7) means to perform certain operations on at least said first signal and said error signal including means to integrate said error signal; means to multiply a signal with another signal including said first signal and means to divide a signal with another signal including at least said first signal in a correlated arrangement such that said certain means utilizes said first, second and third signals in a manner that can be expressed by one of the following equations:

$$D = (C_i - nC_s) K_1 \int \frac{(C_o - C_s)}{(C_i - nC_s)} dt \quad (1)$$

$$D = K_2 \int (C_o - C_s) dt + K_3 \int \frac{D\dot{C}_i}{C_i - C_s} dt \quad (2)$$

wherein D is the dosage as a signal, $C_i$ is a signal proportional to the magnitude of the sensed property of the fluid to be treated, $C_s$ is a signal proportional to the desired magnitude of the sensed property of the product, $C_o$ is a signal proportional to the actual magnitude of the sensed property of the product, $\dot{C}_i$ is a signal that is a derivative of $C_i$, each $n$ separately considered is either 1 or 0, and $K_1$, $K_2$ and $K_3$ are constants; (8) pump means; and (9) means based on said dosage signal to control the operation of a pump.

Although the automatic control device of the invention is advantageously used for the control method of the present invention, some of the steps of the method can be performed manually. For example, the property of the feed and the property of the product can be monitored and recorded. By observation of the recorded values, one can provide signals proportional to these values. The same is true with respect to the ultimate signal. It can be recorded and the operator by observing its change can adjust the dosage accordingly.

The concentration of alum in water to provide a solution for dosage of water to be treated are well known in the art. The actual dosage for a specific water to be treated under ideal conditions can be determined in the laboratory, as mentioned above.

It is understood that the treatment of the water may include an addition of another additive to control pH because the success when using alum is dependent on the water, after alum addition, being within the proper pH range, as is well known in the art.

In view of the foregoing, it will be obvious to one skilled in the art that modifications of some parts of the device of the present invention can be substituted by other components providing the same function. The foregoing description of four embodiments have been merely presented for the purpose of illustration. The invention is limited solely by the claims that follow.

We claim:
1. A method to control dosage of additive into a fluid, in a continuous treatment process for a fluid that contains an ingredient that is changed by the presence of the additive, which comprises:
monitoring the fluid to be treated to sense a property of the fluid relevant to the treatment of the fluid by the additive;
generating a first signal proportional to the magnitude of the sensed property of the fluid to be treated;
monitoring a product of the treatment process to sense a property of that product relevant to the desired result of the treatment process;
generating a second signal proportional to the desired magnitude of the sensed property of the product;
generating a third signal proportional to the magnitude of the actual sensed property of the product;
comparing the second and third signals to provide a fourth signal indicating the difference between the actual and the desired sensed property of the product;
performing certain operations including an integrating operation, a multiplying operation and a dividing operation in which said first signal is utilized in the multiplyng operation and in the dividing operation as a divider and in which said fourth signal is used in the integrating operation along with a relationship between these operations such that these certain operations can be expressed mathematically in their function in accordance with one of the following equations:

$$D = (C_i - nC_s)K_1 \int \frac{(C_o - C_s)}{(C_i - nC_s)} dt$$

$$D = K_2 \int (C_o - C_s) dt + K_3 \int \frac{D\dot{C}_i}{C_i - C_s} dt$$

wherein D is the dosage as a signal, $C_i$ is a signal proportional to the magnitude of the sensed property of the fluid to be treated, $C_s$ is a signal proportional to the desired magnitude of the sensed property of the product, $C_o$ is a signal proportional to the actual magnitude of the sensed property of the product, $\dot{C}_s$ is a signal that is a derivative of $C_i$, each $n$ separately considered is either 1 or 0, and $K_1$, $K_2$ and $K_3$ are constants; and using said dosage signal to adjust the dosage of additive into the fluid.

2. The method of claim 1 wherein said performing operations comprises:
   superimposing said first signal on said fourth signal by dividing the latter by the former to provide a fifth signal;
   integrating the fifth signal over a long period of time to provide a sixth signal; and
   multiplying the first signal by the sixth signal to obtain a seventh signal that represents a variation of the first signal by the extent of the sixth signal, and
wherein the seventh signal is used as said dosage signal to adjust the dosage of additive into the fluid.

3. The method of claim 2 wherein said fluid is a liquid.

4. The method of claim 3 wherein said liquid is an aqueous liquid.

5. The method of claim 4 wherein said aqueous liquid is water containing suspended colloidal material and the additive is a material that promotes the separation of colloidal material from the water to provide water as a product having a reduced concentration of suspended colloidal material.

6. The method of claim 5 wherein the first, second and third signals are voltage signals.

7. The method of claim 6 wherein the turbidity of the water to be treated and the turbidity of the water as a product are the property of these liquids that are monitored.

8. The method of claim 7 wherein the additive is alum.

9. The method of claim 1 wherein said performing certain operations comprises:
   differentiating said first signal proportional to the actual magnitude of the sensed property of the fluid to be treated to provide a fifth signal;
   multiplying said fifth signal from this differentiation operation by said dosage signal to provide a sixth signal;
   comparing said first signal proportional to the actual magnitude of the sensed property of the fluid to be treated and said second signal proportional to the desired magnitude of the sensed property of the product to provide a seventh signal;
   dividing said sixth signal by said seventh signal to provide an eighth signal; and
   summing integrating said fourth signal and said eighth signal in accordance with the second equation of claim 1 to provide a ninth signal, and
wherein said ninth signal is said dosage signal that is used to adjust the dosage of additive into the fluid and that is used in said multiplication operation with said fifth signal.

10. The method of claim 9 wherein said fluid is a liquid.

11. The method of claim 10 wherein said liquid is an aqueous liquid.

12. The method of claim 11 wherein said aqueous liquid is water containing suspended colloidal material and the additive is a material that promotes the separation of colloidal material from the water to provide water as a product having a reduced concentration of suspended colloidal material.

13. The method of claim 12 wherein the first, second and third signals are voltage signals.

14. The method of claim 13 wherein the turbidity of the water to be treated and the turbidity of the water as a product are property of these liquids that are monitored.

15. The method of claim 14 wherein the additive is alum.

16. An automatic control device, that is suitable in a method to control dosage of additive into a fluid in a continuous treatment process for a fluid that contains an ingredient that is changed by the presence of the additive, which comprises:
   first means to monitor a fluid to sense a property of the fluid to be treated;
   means to generate a first signal proportional to the actual magnitude of the property sensed by said first monitoring means;
   second means to monitor a product of the treatment of the fluid to sense a property of that product;
   means to generate a second signal proportional to the desired magnitude of the property sensed by said second monitoring means;
   means to generate a third signal proportional to the magnitude of the property actually sensed by said second monitoring means;
   means to compare the second and third signals to provide a fourth signal indicating a difference between the actual and desired magnitude of the property sensed by said second monitoring means;
   means to perform certain operations on at least said first signal and said fourth signal including means to integrate said fourth signal, means to multiply a signal with another signal including said first signal and means to divide a signal with another signal including at least said first signal in a correlated arrangement such that said certain means utilizes said first, second and third signals in a manner that can be expressed by one of the following equations:

$$D = (C_i - nC_s)K_1 \int \frac{(C_o - C_s)}{(C_i - nC_s)} dt$$

$$D = K_2 \int (C_o - C_s) dt + K_3 \int \frac{D\dot{C}_i}{C_i - C_s} dt$$

wherein D is the dosage as a signal, $C_i$ is a signal proportional to the magnitude of the sensed property of the fluid to be treated, $C_s$ is a signal proportional to the desired magnitude of the sensed property of the product, $C_o$ is a signal proportional to the actual magnitude of the sensed property of the product, $\dot{C}_i$ is a signal that is a derivative of $C_i$, each $n$ separately considered is either 1 or 0, and $K_1$, $K_2$ and $K_3$ are constants to provide a dosage signal from said means to perform certain operations;
   variable feed means delivering the additive to the fluid to be treated; and
   means based on said dosage signal to control the operation of said variable feed means.

17. The device of claim 16 wherein said variable feed means is pump means, wherein said means to perform certain operations on at least said first signal and said fourth signal includes:
   means to divide the fourth signal to provide a fifth signal;
   means to integrate the fifth signal over a long period of time to provide a sixth signal; and
   means to multiply the first signal by the sixth signal to obtain a seventh signal, and
wherein said seventh signal provides means by which said pump means can be controlled in its operation to vary the dosage of additive incorporated into a flow of fluid as part of a process of treating the fluid.

18. The device of claim 17 wherein said means to generate said first, second and third signals are means to generate voltage signals.

19. The device of claim 18 wherein said first monitoring means and said second monitoring means are means to monitor turbidity of an aqueous liquid.

20. The device of claim 18 wherein said means to integrate said fifth signal and said means to multiply said first signal by said sixth signal to obtain said seventh signal comprises:
  means responsive to the fifth signal to convert voltage to pulse frequency in which the rate of pulse is proportional to the voltage level of said fifth signal;
  a motor controller responsive to said pulse frequencies to provide pairs of pulses that are positive or negative based on the nature of said fifth voltage signal being converted;
  a stepper motor responsive to said motor controller to step the motor in one direction or the other dependent on whether the pair of pulses is positive or negative as determined by the motor controller;
  a gearhead connected to the stepper motor to be driven by said motor at a slower rate;
  a potentiometer driven by said gearhead;
  means connecting said first signal to said potentiometer; and
  means connecting said potentiometer to said pump means, to provide a voltage to said pump means, whereby said position of said potentiometer driven by said stepper motor and said gearhead provides an indication of the integration of said fifth signal as a sixth signal and said connection of said first signal with said potentiometer and said means connecting said potentiometer and said pump means provides a multiplication of said sixth signal and said first signal.

21. The device of claim 20 wherein said first monitoring means and said second monitoring means are means to monitor turbidity of an aqueous liquid.

22. The automatic device of claim 16 wherein said variable feed means is pump means, wherein said means to perform said certain operations on at least said first signal and said fourth signal includes:
  summing integrator means to provide a fifth signal;
  means responsive to said first signal to provide a derivative of said first signal as a sixth signal;
  multiplier means responsive to said fifth signal and said sixth signal to multiply said fifth signal and said sixth signal to provide a seventh signal;
  means to compare said first signal and said second signal to provide an eighth signal representing the difference between said first and second signals; and
  divider means responsive to provide a ninth signal representing said seventh signal divided by said eighth signal, and
wherein said summing integrator means is responsive to said fourth signal and said ninth signal in accordance with the second equation of claim 16 to provide said fifth signal that is used also as said dosage signal.

23. The device of claim 22 wherein said first monitoring means and said second monitoring means are means to monitor turbidity of an aqueous liquid.

References Cited

UNITED STATES PATENTS

| | | | |
|---|---|---|---|
| 2,977,199 | 3/1961 | Quittner | 137—3X |
| 3,174,298 | 3/1965 | Kleiss | 235—151.12X |
| 3,262,878 | 7/1966 | Beckley et al. | 210—53 |
| 3,394,053 | 7/1968 | Shinskey | 235—151.12X |
| 3,441,956 | 4/1969 | Farnham | 137—93X |

LAVERNE D. GEIGER, Primary Examiner

D. J. ZOBKIW, Assistant Examiner

U.S. Cl. X.R.

137—93; 210—42, 53, 96; 235—151.12

UNITED STATES PATENT OFFICE
CERTIFICATE OF CORRECTION

Patent No. 3,605,775　　　　　Dated September 20, 1971

Inventor(s) Carl J. Zaander et al.

It is certified that error appears in the above-identified patent and that said Letters Patent are hereby corrected as shown below:

Column 2, line 69, "field" should read --fields--.

Column 5, line 73, after "$K_1$" insert --, $K_2$--.

Column 7, line 75, "has" should read --had--.

Column 12, line 27, "valve" should read --value--.

Line 35, "the embodiment" should read --this embodiment--.

Line 53, "later" should read --latter--.

Line 58, "for" should read --of--.

Column 13, line 51, "$C_i$" should read --$\dot{C}_i$--.

Column 15, line 15, "$\dot{C}_s$" should read --$\dot{C}_i$--.

Signed and sealed this 21st day of March 1972.

(SEAL)
Attest:

EDWARD M. FLETCHER, JR.　　　　　ROBERT GOTTSCHALK
Attesting Officer　　　　　　　　Commissioner of Patents